United States Patent
Grace

(10) Patent No.: US 7,222,365 B2
(45) Date of Patent: May 22, 2007

(54) NON-ALGORITHMIC VECTORED STEGANOGRAPHY

(75) Inventor: David Grace, Superior, CO (US)

(73) Assignee: Metavante Corporation, Brown Deer, WI (US)

( * ) Notice: Subject to any disclaimer, the term of this patent is extended or adjusted under 35 U.S.C. 154(b) by 43 days.

(21) Appl. No.: 11/067,294

(22) Filed: Feb. 25, 2005

(65) Prior Publication Data

US 2006/0005037 A1  Jan. 5, 2006

Related U.S. Application Data

(60) Provisional application No. 60/548,834, filed on Feb. 26, 2004.

(51) Int. Cl.
    *H04L 9/00*  (2006.01)
(52) U.S. Cl. .......................... 726/18; 705/64
(58) Field of Classification Search ............ 713/168; 726/5, 6, 7, 8, 9, 18, 19, 20; 705/67, 72, 705/75, 76
    See application file for complete search history.

(56) References Cited

U.S. PATENT DOCUMENTS

| | | | |
|---|---|---|---|
| 4,259,720 A | 3/1981 | Campbell | |
| 4,827,508 A | 5/1989 | Shear | |
| 4,906,828 A | 3/1990 | Halpern | |
| 5,220,501 A | 6/1993 | Lawlor et al. | |
| 5,371,797 A | 12/1994 | Bocinsky, Jr. | |
| 5,453,601 A | 9/1995 | Rosen | |
| 5,457,746 A | 10/1995 | Dolphin | |
| 5,539,828 A | 7/1996 | Davis | |
| 5,590,197 A | 12/1996 | Chen et al. | |
| 5,623,547 A | 4/1997 | Jones et al. | |
| 5,677,953 A | 10/1997 | Dolphin | |
| 5,734,823 A | 3/1998 | Saigh et al. | |
| 5,771,291 A | 6/1998 | Newton et al. | |
| 5,850,446 A | 12/1998 | Berger et al. | |
| 5,870,724 A | 2/1999 | Lawlor et al. | |
| 5,889,863 A | 3/1999 | Weber | |
| 5,892,900 A | 4/1999 | Ginter et al. | |
| 5,903,881 A | 5/1999 | Schrader et al. | |
| 5,913,202 A | 6/1999 | Motoyama | |

(Continued)

OTHER PUBLICATIONS

Sueyoshi et al., "Steganography for e-Business: An Offensive Use of Information Security", 2004, Asia Pacific Management Review, pp. 943-968.*

(Continued)

*Primary Examiner*—Matthew Smithers
(74) *Attorney, Agent, or Firm*—Townsend and Townsend and Crew LLP

(57) ABSTRACT

According to the invention, a system for verifying a steganogram is disclosed. Included in the system are a first system, a second system, a steganogram, and a steganogram preparer. The first system is coupled to an access device by way of a public network. The second system coupled to the first system. The steganogram is comprised of random data and encrypted information, which is randomly dispersed throughout the steganogram. The steganogram preparer provides the steganogram to the access device. The first system gathers a subset of the encrypted information from the access device. The second system receives the subset or a derivative of the subset and verifies that the subset or a derivative of the subset is from the steganogram.

19 Claims, 5 Drawing Sheets

U.S. PATENT DOCUMENTS

| | | |
|---|---|---|
| 5,956,483 A | 9/1999 | Grate et al. |
| 6,065,073 A | 5/2000 | Booth |
| 6,073,160 A | 6/2000 | Grantham et al. |
| 6,098,053 A | 8/2000 | Slater |
| 6,173,269 B1 | 1/2001 | Solokl et al. |
| 6,195,357 B1 | 2/2001 | Polcyn |
| 6,505,178 B1 | 1/2003 | Flenley |
| 6,526,489 B1 | 2/2003 | Kikuchi et al. |
| 6,553,492 B1 | 4/2003 | Hosoe |
| 2002/0152180 A1 | 10/2002 | Turgeon |
| 2003/0014371 A1 | 1/2003 | Turgeon |
| 2003/0204728 A1* | 10/2003 | Irwin .................. 713/176 |
| 2004/0064537 A1* | 4/2004 | Anderson et al. ......... 709/223 |
| 2004/0103325 A1* | 5/2004 | Priebatsch ............... 713/202 |
| 2005/0065886 A1* | 3/2005 | Andelin et al. ............ 705/50 |

OTHER PUBLICATIONS

Sung et al., "Defeating the Current Steganalysis Techniques (Robust Steganography)", 2004, IEEE Computer Society.*

Sueyoshi, T. "*Steganography for e-Business: An Offensive Use of Information Security*" Asia Pacific Management Review, (2004) 9(5), pp. 943-968, USA.

Sung, A.H. "*Defeating the Current Steganalysis Techniques (Robust Steganography)*" Proceedings of the International Conference on Information Technology: Coding and Computing (ITCC '04), 5 pages, USA.

* cited by examiner

NON-ALGORITHMIC VECTORED STEGANOGRAPHY

CROSS REFERENCE TO RELATED APPLICATION

This application is a nonprovisional of, and claims the benefit of the filing date of, U.S. Provisional Patent Appl. No. 60/548,834, entitled "NON-ALGORITHMIC VECTORED STEGANOGRAPHY," filed Feb. 26, 2004 by David Grace, the entire disclosure of which is incorporated by reference for all purposes.

This application incorporates by reference U.S. application Ser. No. 10/086,793 filed on Mar. 1, 2002, in its entirety.

BACKGROUND OF THE INVENTION

This invention relates in general to credentials and, more specifically, to hardening a credentials at the point of presentment.

Credentials are used to authenticate persons and equipment in electronic systems. For example, a credential could be formed by encrypting a payload to form a cryptogram. Presentment of the cryptogram allows the receiving entity to decrypt and check the payload in the cryptogram against the known payload. If the received payload matches the known payload, the credential is authentic, and presumably, so is the person or equipment at the point of presentment. A copy of the cryptogram or payload and key allows others to impersonate the true owner of the credential.

A credential can be protected using signatures or other cryptographic techniques. A credential can be successively signed or encrypted by multiple parties to authenticate a chain of those parties. Verification of the encryption or signatures allows confirming an audit trail for the payload through the chain.

Hardware and/or software is often used at the point of presentment to provide a stored credential or generate a credential. Those skilled in the art trust hardware more than software when dealing with credentials. There are robust techniques to protect against hardware tampering, but software is generally seen as being more vulnerable to hackers. Hardware is problematic also because of the expense in deployment in large systems. For example, providing authentication hardware to all users of Internet as the point of presentment is problematic.

Credit cards are often used to purchase items over the Internet. The user enters information printed on the card into a computer terminal. This is passed to the merchant with a secure channel in many cases. The merchant checks the provided information and charges the account. Possession of the card information by hackers is a ubiquitous source of fraud, because authentication is often presumed for anyone who possesses the card information.

BRIEF DESCRIPTION OF THE DRAWINGS

The present invention is described in conjunction with the appended figures.

Figure 1:
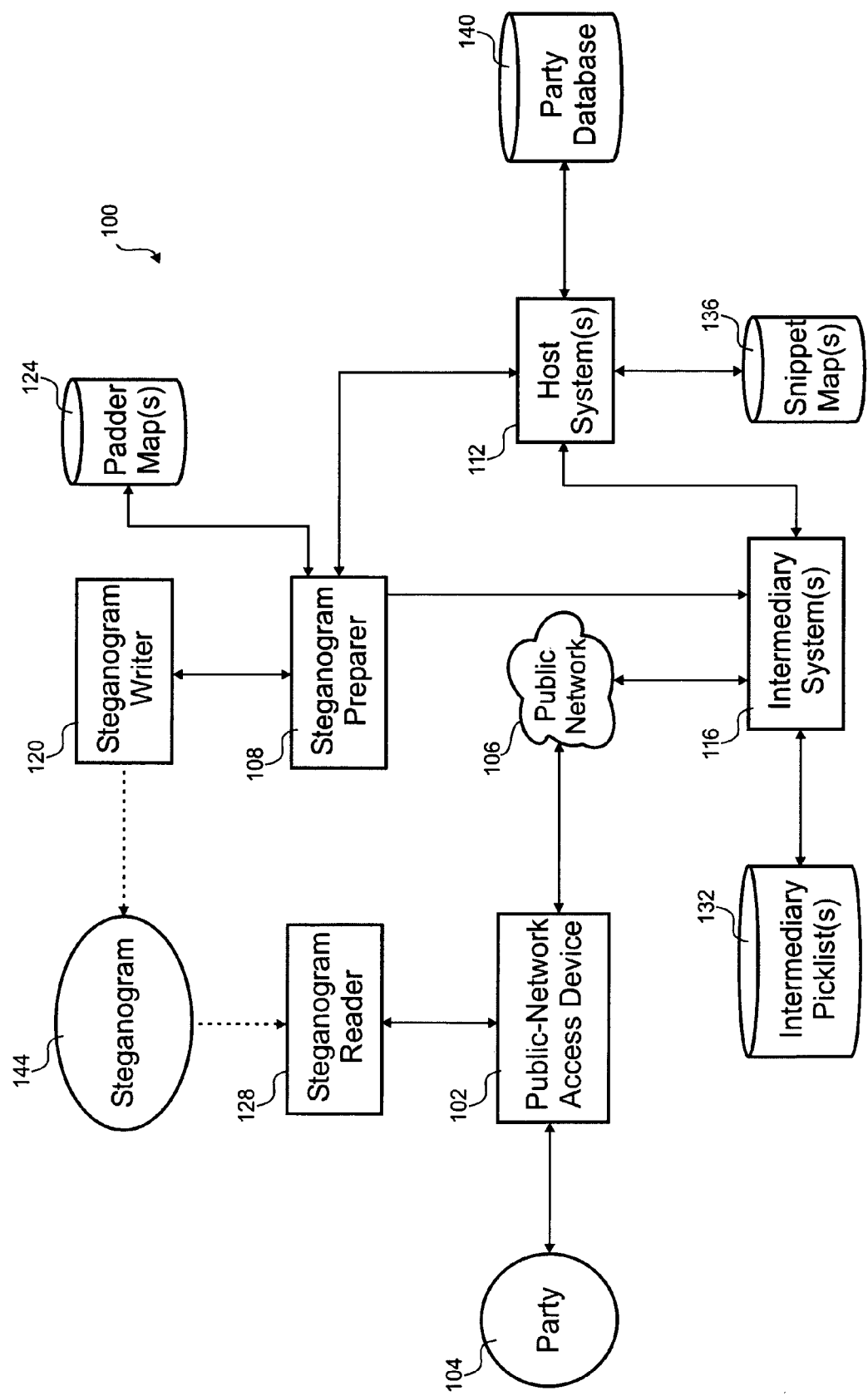
FIG. 1 is a block diagram of an embodiment of a verification system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE PREFERRED EMBODIMENT

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

In one embodiment, the present invention provides a system for verifying a steganogram. Included in the system are a first system, a second system, a steganogram, and a steganogram preparer. The first system is coupled to an access device by way of a public network. The second system coupled to the first system. The steganogram is comprised of random data and encrypted information, which is randomly dispersed throughout the steganogram. The steganogram preparer provides the steganogram to the access device. The first system gathers a subset of the encrypted information from the access device. The second system receives the subset or a derivative of the subset and verifies that the subset or a derivative of the subset is from the steganogram.

In another embodiment, the present invention provides a method for verifying a steganogram. A blank steganogram comprised of random digital data is generated. A portion of the blank steganogram is replaced with encrypted information to produce a steganogram. The steganogram is sent to a party with access to an access device. The access device is remotely queried for at least some of the encrypted information of the steganogram. The at least some of the encrypted information is checked against stored information to verify the steganogram.

In yet another embodiment, the present invention provides a method for verifying a steganogram a plurality of times. A blank steganogram comprised of random digital data is generated. A portion of the blank steganogram is replaced with encrypted information to produce a steganogram. The steganogram is sent to a party with access to an access device. The access device is remotely queried for a first subset of the encrypted information of the steganogram. A first party token is determined from the first subset. The first party token is checked against stored information to verify the steganogram a first time. The access device is remotely queried again for a second subset of the encrypted information of the steganogram. The second subset is different from the first subset. A second party token from the second subset is determined. The second party token is checked against stored information to verify the steganogram a second time.

Referring initially to FIG. 1, a block diagram of an embodiment of a verification system 100 is shown. The verification system 100 issues steganograms 144 to a number of parties 104. The parties 104 can be authenticated using the steganograms 144. Using the steganogram 144, a intermediary system 116 can gather protected snippets from the steganogram 144. The snippets are partially processed by the intermediary system 116 and passed back to a host system 112 for further processing. The processing of the protected snippets produces a party static token that can be checked against a stored party static token. If the tokens match, it can be presumed that the steganogram 144 is valid and, by implication, that the party is authenticated.

The host system 112 in this embodiment is a payment system, for example, a debit or credit card processor, a check processor, a money transferor, etc. But, the host system 112 could be anyone wishing to remotely authenticate a party 104 who is using a public-network access device (PNAD) 102 over a public network 106. The host system 112 creates or obtains a static party token for each of a number of parties 104 that could use the host system 112 for payment, for example. In this embodiment, the static party token is a credential that includes information to identify the financial account and other information associated with the party.

The static party tokens for all parties 104 who use the host system 112 are stored in a party database 140. An example of some of the entries in the party database are shown in TABLE I. Each static party token has an associated cryptogram key that is randomly chosen. In other embodiments, the cryptogram key could be unique to each party, or some parties could use the same key. In this embodiment, the cryptogram key is used to symmetrically encrypt the party static token to formulate a cryptogram for each party 104. The party static token in this embodiment is 80 bytes, but other embodiments could have different lengths, for example, 480 bytes. A DES algorithm is used in this embodiment to create the cryptogram, but triple DES, AES, RSA, or other symmetric and asymmetric algorithms could be used. In verification systems 100 with multiple host systems 112, each would have at least one party database 140.

TABLE I

Party Database

| Party No. | Cryptogram Key | Party Static Token |
|---|---|---|
| 1 | 7807270893742 . . . 0943 | 9743 . . . 88 |
| 2 | 7619467364872 . . . 1736 | 8745 . . . 45 |
| 3 | 4239487924659 . . . 9012 | 3245 . . . 75 |
| . | . | . |
| . | . | . |
| . | . | . |
| m | 1675237654718 . . . 2165 | 6574 . . . 23 |

The host system 112 is also coupled to a database with one or more snippet maps 136. Each host system 112 in the verification system 100 has at least one snippet map 136. An example of one snippet map 136 for an embodiment is shown below in TABLE II. The intermediary system 116 queries the steganogram 144 to formulate snippets of the cryptogram, which are provided to the host system 112 along with an associated map entry numbers. The snippet map 136 is used to determine where a particular snippet falls within the cryptogram. Because the intermediary system 116 does not have the snippet map, the cryptogram cannot necessarily be reformulated without access to the snippet map 136. In this embodiment, there are multiple intermediary systems 116 that each receive a subset of the map entries. The entries that each intermediary receives is optionally tracked in the snippet map 136. For example, the first map entry in the snippet map 136 was distributed to intermediary systems A, B, L and Z 116. Receiving a snippet corresponding to a map entry from a intermediary system 116 not indicated in the snippet map 136 would indicate an error.

TABLE II

Snippet Map

| Map Entry | Position in Cryptogram | Length of Snippet | Intermediary Distribution |
|---|---|---|---|
| 1 | 67 | 7 | A, B, L, Z |
| 2 | 0 | 80 | L |
| 3 | 45 | 1 | E, R, Y, Z |
| . | . | . | . |
| . | . | . | . |
| . | . | . | . |
| n | 23 | 43 | Z |

The steganogram preparer 108 generates steganograms 144 for the parties 104 in the verification system 100. Generally, the steganogram 144 is large amount of random digital data that also contains certain other information obscured in the random data. The various hosts 140 provide the cryptograms for each party 104 in their database 140. Some embodiments produce a steganogram 144 for each host system 112 such that a particular party may receive many steganograms 144, while other embodiments generate a single steganogram 144 for each party that could include cryptogram information for multiple host systems 112. The steganogram 144 is a physical media produced by a steganogram writer 120, such as an optical card or disk; a flash memory, a ROM, or other solid state dongle; a magnetic disk or card; a holographic media; a quantum memory; etc.

Generation of padder maps 124 is also performed with the steganogram preparer 108 using cryptograms generated from the party database 140. An intermediary picklist(s) 132 and the snippet map(S) 136 are derived from the padder map 124. Each host system 112 could use the same or a different padder map 124 than those of the other host systems 112. Further, a particular host system 112 could use a single padder map 124 for the parties 104 in their database 140 or could a number of padder maps 124. In one extreme, there could be a padder map 124 for each party 104. An example padder map 124 for one embodiment is shown in TABLE III. Each map entry indicates the size and placement of the cryptogram snippet in the steganogram 144.

TABLE III

Padder Map

| Map Entry | Position in Cryptogram | Snippet Location | Length of Snippet | Snippet Key | Position in Key | Intermediary Distribution |
|---|---|---|---|---|---|---|
| 1 | 67 | 24908 | 7 | 7908234110987 . . . 8908 | 505 | A, B, L, Z |
| 2 | 0 | 83 | 80 | 7093457608946 . . . 7834 | 1 | L |
| 3 | 45 | 3857462 | 1 | 0990958347574 . . . 8547 | 324 | E, R, Y, Z |
| . | . | . | . | . | . | . |
| . | . | . | . | . | . | . |
| . | . | . | . | . | . | . |
| n | 23 | 409875 | 43 | 9745986347862 . . . 4734 | 184 | Z |

Each snippet is encrypted with the snippet key for that map entry. The various entries may have unique keys, random keys or share a number of keys. This embodiment uses the 512 Byte key in a exclusive-OR (XOR) polynomial to encrypt the cryptogram snippet. Further, the cryptogram snippet is randomly placed in the XOR polynomial. For example, the snippet for the third map entry is one byte in length and begins its encryption at the 324th byte of the key polynomial. Other embodiments could use different encryption algorithms that are suitable for snippets as small as one byte.

The party 104 is a user that is remotely verified with the steganogram. A PNAD 102 is available to the party 104 and is coupled to a steganogram reader 128 of some sort. The PNAD 102 could be any computing device with application software or script-interpreting software to allow gathering information from the steganogram 144, for example, a personal computer, a web-browsing appliance, a personal digital assistant, a web pad, a tablet computer, etc. The steganogram reader 128 could be an interface port such as a USB or IEEE-1394 port or an optical disk or card reader. In this embodiment, the steganogram reader 128 is a CD-ROM reader. Each time verification is needed, the steganogram 144 could be loaded into the reader 128 or the steganogram 144 could be copied to a hard drive, another optical drive or other storage media.

Where the steganogram is stored in the PNAD 102, security mechanisms could be used to prevent copying of the steganogram. In this embodiment, the steganogram 144 is 100 MegaBytes, 650 MegaBytes, 4.7 GigaBytes, 25 GigaBytes or more such that the size discourages electronic transfer of the steganogram 144 to another computer. Some embodiments could use a media for the steganogram 144 that self-destructs after a period of time. For example, once a compact disk holding the 650 MegaByte steganogram 144 is opened, the party 104 has two days to read the steganogram into the PNAD 102 before the steganogram disk becomes unreadable.

The PNAD 102 connects through a public or private network 106 to the intermediary system 116 during the verification process. The public network 106 could support a secured and encrypted link between the PNAD 102 and the intermediary system 116, while other embodiments may not protect the snippets passing in the public network 106. Some examples of the network 106 include a dial-up or telephone circuit and/or an Internet connection. The intermediary system 116 specifies those portions of the steganogram 144 to read and send from the PNAD 102 to the intermediary system 116. The portions to read from the steganogram 144 are specified in an intermediary picklist 132. Many intermediary picklists 132 could be stored to support multiple host systems 140 and/or multiple padder maps 124. In this embodiment, the intermediary system 116 is a back-end system for clearing various forms of payment. The intermediary system 116 could attach to any number of host systems 112 to clear payments.

An example of an intermediary picklist 132 for this embodiment is shown in TABLE IV. This picklist 132 includes a subset of the information in the padder map. The intermediary is given some, but not all, map entries with enough information to find and decrypt the snippet. Other embodiments could give all map entries to some or all intermediary systems 116. The intermediary system 116 could sequentially pick a number of map entries where a group of say ten entries would be enough to reconstruct the whole cryptogram. Other embodiments could randomly gather map entries until the cryptogram is likely captured. In any event, the information gathered from the steganogram 144 is likely to be different for each transaction to reduce replay risk. The intermediary system 116 could assure that the information gathered in the snippets is different each time by choosing a unique list of map entries.

TABLE IV

Intermediary Picklist

| Map Entry | Location in Token | Length of Snippet | Snippet Key | Position in Key |
|---|---|---|---|---|
| 3 | 38957462 | 1 | 0990958347574 . . . 8547 | 324 |
| 206 | 98759875 | 78 | 9087098235678 . . . 2334 | 194 |
| 514 | 897849552 | 23 | 7887385682734 . . . 2564 | 4 |
| . | . | . | . | . |
| . | . | . | . | . |
| . | . | . | . | . |

Although the above embodiment chooses individual snippets, some embodiments could grab a raw block of data from the steganogram. The snippets from that block could be extracted after transport over the public network 106. The padder map 124 could be designed such that a block of a given size was assured to have a complete copy of the cryptogram. Alternatively, a block could be requested such that it is likely to have a complete cryptogram, but if it did not have a complete block, another could be requested.

Figure 2:
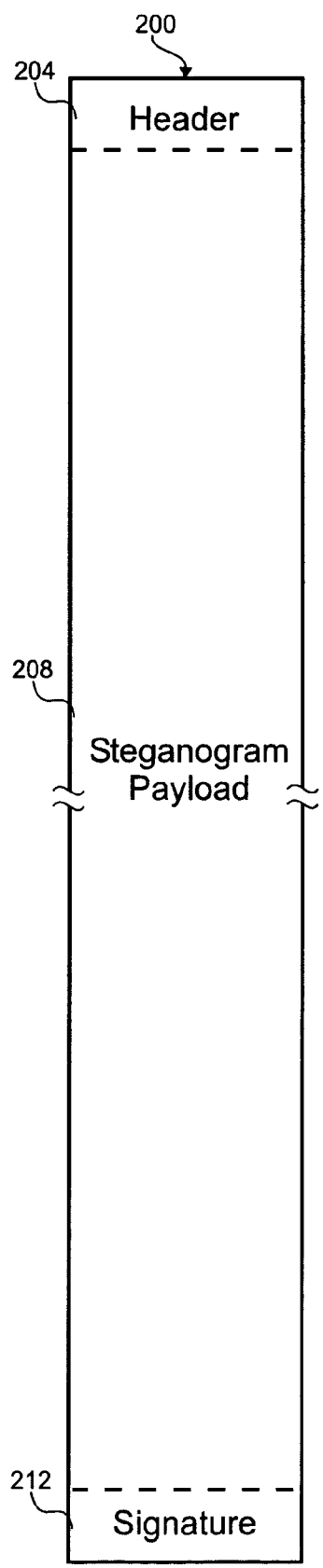
FIG. 2 is a data structure of an embodiment of a steganogram.

With reference to FIG. 2, a data structure of an embodiment of a steganogram 200 is shown. The steganogram 200 includes a header 204, a payload 208 and a signature 212. The signature could be used to verify that the payload 208 is not corrupted. The payload could be plaintext or ciphertext in various embodiments. Encryption of the payload would allow securing the transport of the steganogram. In this embodiment, the steganogram 200 is about 650 MegaBytes such that it fits on a standard CD-ROM. About 1% of the random information originally making up the steganogram payload 208 is replaced by the encrypted snippets of the cryptogram. For example, the cryptogram could be copied ten thousand times, for example, before division into snippets for placement in the steganogram. The size of the snippets is random in this embodiment, but other embodiments could have snippets of uniform size. Also, the portion of the cryptogram chosen for the snippet is random in this embodiment.

Other embodiments could divide the payload 208 into blocks. A single copy of the steganogram is randomly divided-up, encrypted and randomly placed in the block. The padder map 124 reflects the distribution of the snippets in the block.

Multiple cryptograms could be embedded in a single steganogram. The corresponding padder maps would be chosen such that the snippets associated with one cryptogram do not overwrite the snippets for the other cryptogram. In this way, any number of cryptograms could be embedded in the steganogram 144.

Figure 3:
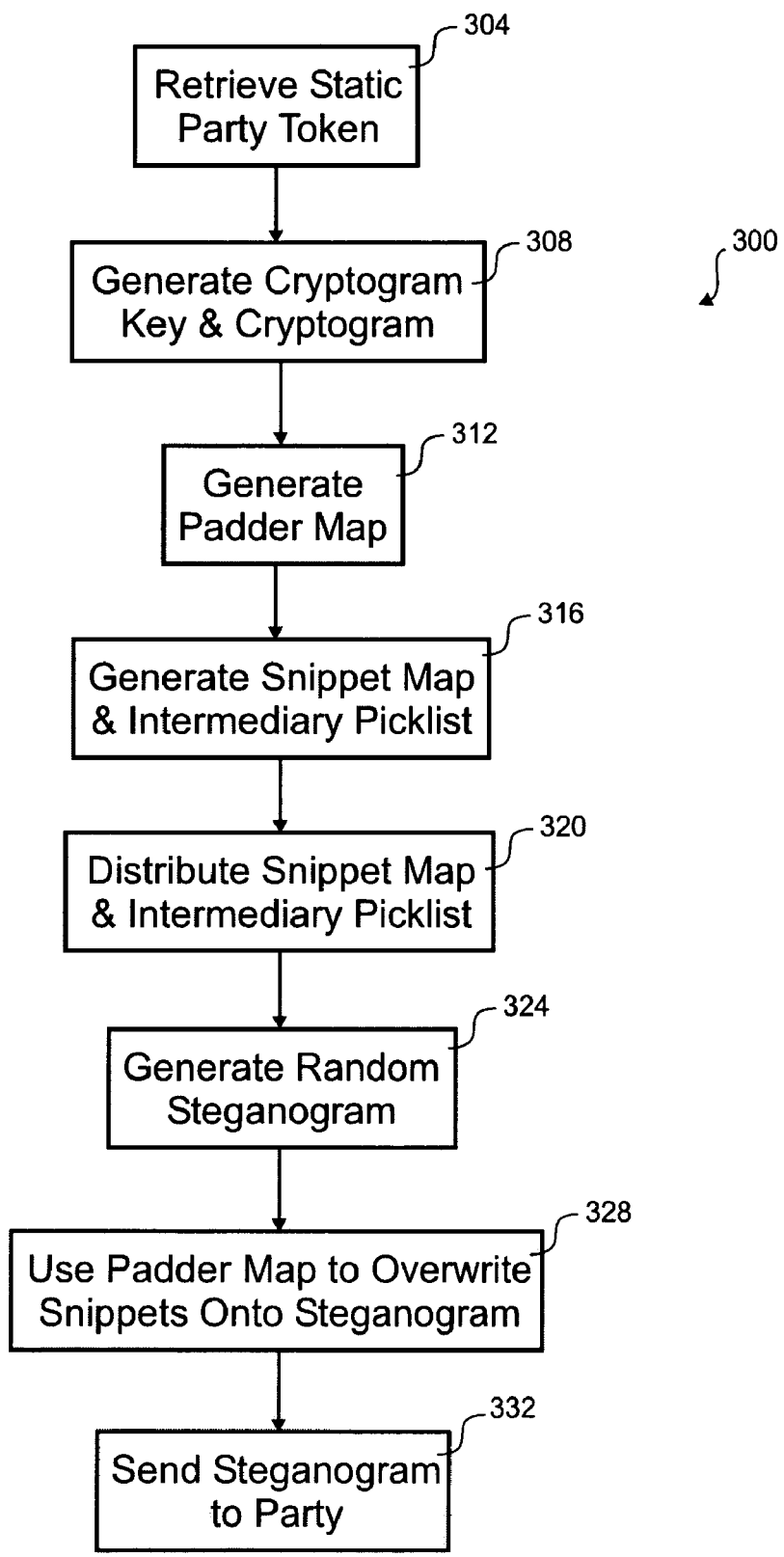
FIG. 3 is a flow diagram of an embodiment of a process for generating a steganogram and the various tables for interpretation of the steganogram.

Referring to FIG. 3, a flow diagram of an embodiment of a process 300 for generating a steganogram 144 and the various tables for interpretation of the steganogram 144 is shown. The depicted portion of the process begins in step 304 where the steganogram preparer 108 receives a static party token from the host system 112 along with the cryptogram key to use in converting the static party token into a cryptogram in step 308. It is to be understood, that many static party tokens may be received a one time from the host system 112. In this embodiment, the steganogram preparer 108 encrypts the static party token to create the cryptogram, but in other embodiments, the host system 112 could perform the encryption and pass the cryptograms to the steganogram preparer.

A padder map 124 is created in step 312. In many cases, the padder map 124 already exists and is reused for many different parties 104. Where none exists, the snippets, snippet keys, start point in the key, placement of snippets in the steganogram, and distribution of map entries among the intermediaries 116 are chosen to complete the padder map 124. In step 316, the snippet map 136 and intermediary picklist 132 are generated from the padder map 124 and distributed in step 320. A random, blank, steganogram payload 208 is generated in step 324 for the party 104. Each party has a different steganogram payload 208.

The blank steganogram is overwritten with the snippets according to the padder map 124 in step 328. This process involves taking random sized and placed portions of the cryptogram and encrypting those portions to create the snippets. Once the steganogram 144 is completed for the party, it is written to a media with the steganogram writer 120. The steganogram is sent to the party 104 in step 332. In this embodiment, the steganogram is mailed or couriered to the party 104.

Other embodiments could electronically send the steganogram 144. Some embodiments may give the party 104 a choice of the possible media for transporting the steganogram 144. Based upon the capacity of the media, the steganograms could have different sizes. The padder map 124 could be the same for the different sized steganograms, where smaller steganograms would only use some of the map entries.

Figure 4A:
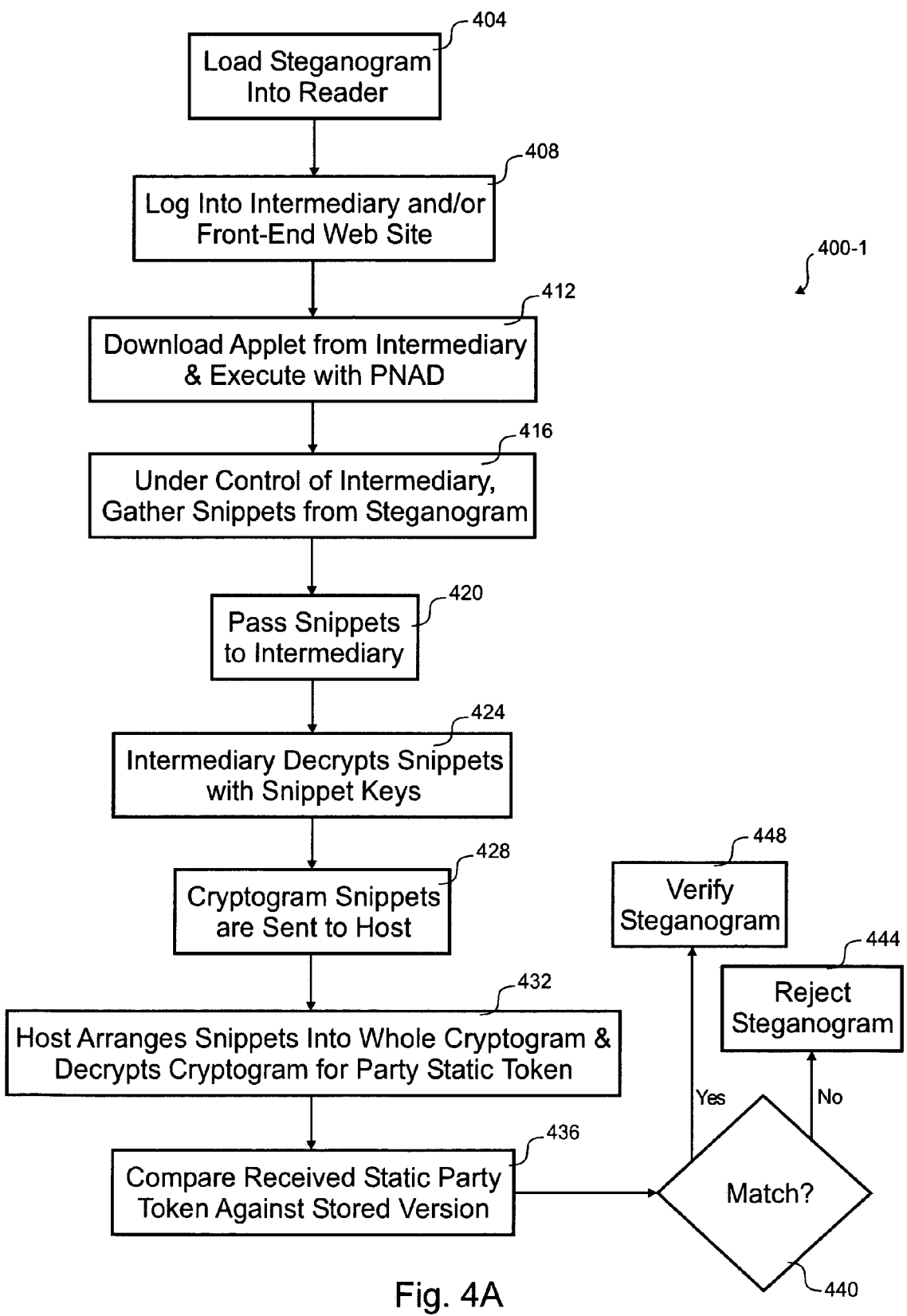
FIG. 4A is a flow diagram of an embodiment of a process for remotely verifying the steganogram.

With reference to FIG. 4A, a flow diagram of an embodiment of a process 400-1 for remotely verifying the steganogram 144 is shown. In this embodiment, the intermediary system 116 takes individual snippets from the steganogram 144. The depicted portion of the process begins in step 404, where the party 104 loads the steganogram 144 into the reader 128. This embodiment has a login into the intermediary system 116 or front-end web site in step 408 where the steganogram 144 is used to verify the form of payment chosen. Other embodiments could use the steganogram 144 to log into the intermediary system 144.

In this embodiment, the intermediary system 116 provides a downloadable applet to access the steganogram 144 under the control of the intermediary system in 412 to read snippets in step 416. Other embodiments could use application software on the PNAD 102 that selected snippets under the control of the intermediary system 116. Some embodiments could gather more snippets than are necessary to reformulate the cryptogram, while other embodiments could only gather those snippets that are necessary.

In step 420, the snippets are passed back to the intermediary 116. Some embodiments could increase the size of the snippet such that additional random data is sent to the intermediary also. The intermediary uses the picklist 132 to determine the key and placement in the XOR polynomial such that the snippets can be decrypted in step 424.

In step 428, the plaintext snippets are passed back to the host system 112 along with an indication of the map entry used to gather the snippet from the steganogram 144. Using the snippet map 136, the host system 112 reformulates and decrypts the cryptogram to reformulate the party static token in step 432. The reformulated token is compared with the stored version in the party database 140 in step 436. Where they match in step 440, the steganogram 144 is determined valid in step 448. If there is no match in step 440, the steganogram 144 is rejected. By implication, a rejected steganogram would result in the party 104 or payment method being rejected also.

Figure 4B:
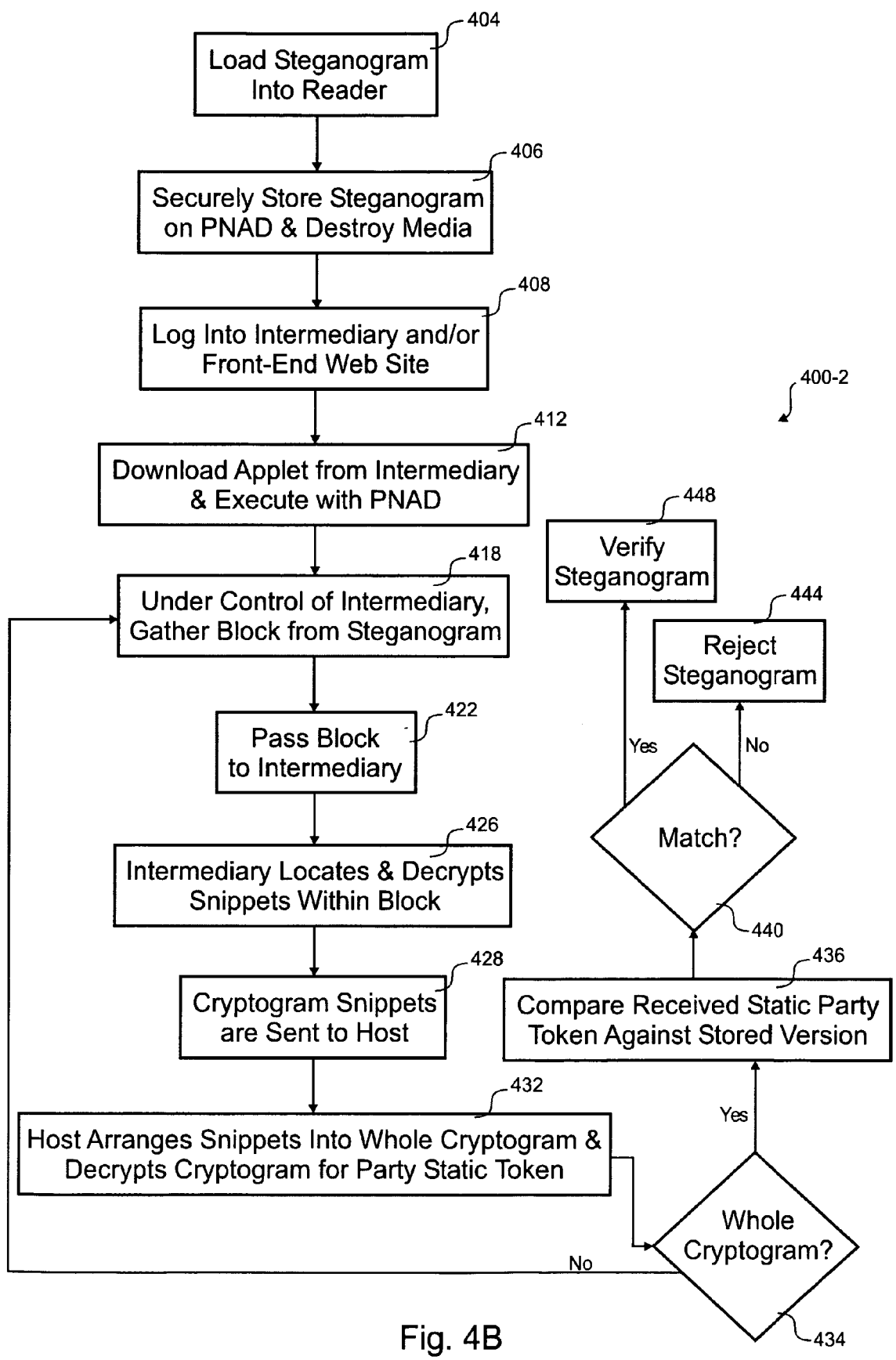
FIG. 4B is a flow diagram of another embodiment of a process for remotely verifying the steganogram.

Referring next to FIG. 4B, a flow diagram of another embodiment of a process 400-2 for remotely verifying the steganogram 144 is shown. In this embodiment, a block of data is gathered from the steganogram 144 and passed to the intermediary system 116 for snippet extraction. The depicted portion of the process varies from the embodiment of FIG. 4A between steps 412 and step 436 and adds new step 406. In step 406, the steganogram 144 is securely stored on the PNAD. Some modern operating systems allow securing files with encryption and password protection.

After step 412, processing continues to step 418 where a block is gathered from the steganogram 144 under the control of the intermediary system 116. The block could be sequential with the last block gathered by the intermediary 116 or could be randomly chosen. This block could be known to include at least one complete copy of the cryptogram or, as is the case in this embodiment, could be presumed to include at least one complete copy. The block is passed back to the intermediary 116 in step 422. The snippets are gathered from the block and decrypted in step 426. Those snippets are sent to the host system 112 in step 428. It is noted that the intermediary system 116 in this embodiment cannot determine the placement and order of the snippets such that the intermediary system 116 alone cannot determine the cryptogram.

The host system 112 uses the snippet map 136 to reformulate the cryptogram and decrypt the cryptogram to determine the static party token in step 432. If the whole cryptogram can be determined in step 434, processing continues to step 436 for processing in the same manner as FIG. 4A. Where a complete cryptogram cannot be found in the block, the intermediary system 116 is asked to gather another block. The gathering of further blocks would continue until one contained the whole cryptogram. The size of the block is chosen such that and incomplete cryptograms is unlikely.

While the principles of the invention have been described above in connection with specific apparatuses and methods, it is to be clearly understood that this description is made only by way of example and not as limitation on the scope of the invention.

What is claimed is:

1. A system for verifying a steganogram, the system comprising:
    a first system coupled to an access device by way of a public network;
    a second system coupled to the first system;
    a steganogram comprised of random data and encrypted information, wherein the encrypted information is randomly dispersed throughout the steganogram; and
    a steganogram preparer that provides the steganogram to the access device, wherein:
        the first system gathers a subset of the encrypted information from the access device, and
        the second system receives the subset or a derivative of the subset and verifies that the subset or a derivative of the subset is from the steganogram.

2. The system for verifying the steganogram as recited in claim 1, further comprising an applet that is stored on the first system for execution on the access device.

3. The system for verifying the steganogram as recited in claim 2, wherein the applet gathers the subset from the steganogram.

4. The system for verifying the steganogram as recited in claim 1, wherein the subset is encoded with a party token.

5. The system for verifying the steganogram as recited in claim 1, wherein the steganogram is larger than about 100 MegaBytes in size.

6. The system for verifying the steganogram as recited in claim 1, wherein the encrypted information comprises about 1% of the steganogram.

7. The system for verifying the steganogram as recited in claim 1, wherein the first system decrypts the subset to produce a derivative of the subset.

8. The system for verifying the steganogram as recited in claim 1, wherein the second system decrypts the subset.

9. The system for verifying the steganogram as recited in claim 1, wherein the subset is comprised of a plurality of snippets derived from a cryptogram.

10. A method for verifying a steganogram, the method comprising steps of:
    generating a blank steganogram comprised of random digital data;
    replacing a portion of the blank steganogram with encrypted information to produce a steganogram;
    sending the steganogram to a party with access to an access device;
    remotely querying the access device for at least some of the encrypted information of the steganogram; and
    checking the at least some of the encrypted information against stored information to verify the steganogram.

11. The method for verifying the steganogram as recited in claim 10, wherein the replacing step comprises steps of:
    encrypting a party token to produce a cryptogram;
    randomly copying a snippets from the cryptogram to produce the encrypted information; and
    overwriting the portion with the encrypted information.

12. The method for verifying the steganogram as recited in claim 11, further comprising a step of repeating the replacing step such that the cryptogram is reproduced a plurality of times within the steganogram.

13. The method for verifying the steganogram as recited in claim 10, wherein the portion is comprised with a plurality of non-contiguous portions of a cryptogram.

14. The method for verifying the steganogram as recited in claim 10, wherein the replacing step comprises steps of:
    encrypting a party token to produce a cryptogram;
    determining a sequential snippet of bits from the cryptogram;
    encrypting the sequential snippet to produce the encrypted information; and
    overwriting the portion with the encrypted information.

15. The method for verifying the steganogram as recited in claim 10, wherein the checking step comprises steps of:
    combining the encrypted information with other encrypted information to produce a cryptogram;
    decrypting the cryptogram to produce a received party token; and
    comparing the received party token against a stored party token; and
    verifying the steganogram if the received party token and the stored party token match.

16. The method for verifying the steganogram as recited in claim 10, wherein the steganogram is about 100 Megabytes or larger.

17. The method for verifying the steganogram as recited in claim 10, further comprising a step of deriving a party token from the encrypted information.

18. A method for verifying a steganogram a plurality of times, the method comprising steps of:
    generating a blank steganogram comprised of random digital data;
    replacing a portion of the blank steganogram with encrypted information to produce a steganogram;
    sending the steganogram to a party with access to an access device;
    remotely querying the access device for a first subset of the encrypted information of the steganogram;
    determining a first party token from the first subset;
    checking the first party token against stored information to verify the steganogram a first time;
    remotely querying the access device for a second subset of the encrypted information of the steganogram, wherein the second subset is different from the first subset;
    determining a second party token from the second subset; and
    checking the second party token against stored information to verify the steganogram a second time.

19. The method for verifying the steganogram recited in claim 18, further comprising a step of repeating the replacing step such that a party token or a derivative of the party token is reproduced a plurality of times within the steganogram.

* * * * *